US009308666B2

(12) United States Patent
Yu

(10) Patent No.: US 9,308,666 B2
(45) Date of Patent: Apr. 12, 2016

(54) BLOCKING ARRANGEMENT OF ELEVATING DEVICE FOR CARPENTRY WORK

(76) Inventor: Ben Yu, Taichung (TW)

(*) Notice: Subject to any disclaimer, the term of this patent is extended or adjusted under 35 U.S.C. 154(b) by 1025 days.

(21) Appl. No.: 13/454,057

(22) Filed: Apr. 23, 2012

(65) Prior Publication Data

US 2013/0000783 A1  Jan. 3, 2013

(30) Foreign Application Priority Data

Jun. 28, 2011 (TW) .............................. 100211734 U

(51) Int. Cl.
B27C 5/02 (2006.01)
B23Q 3/00 (2006.01)
B23Q 5/40 (2006.01)
B27C 1/14 (2006.01)

(52) U.S. Cl.
CPC ... B27C 5/02 (2013.01); B23Q 3/00 (2013.01); B23Q 5/40 (2013.01); B27C 1/14 (2013.01); Y10S 269/90 (2013.01)

(58) Field of Classification Search
CPC .............. B27C 5/02; B27C 5/04; B27C 5/06; B27C 5/10; Y10S 269/901; Y10S 269/90; Y10S 269/909; B23Q 3/00; B23Q 5/142; B23Q 5/32; B23Q 5/40; B25B 1/10; B25B 11/02; B25B 5/10; B25B 5/103
See application file for complete search history.

(56) References Cited

U.S. PATENT DOCUMENTS 6,505,659 B1* 1/2003 Hummel .................. B27C 5/02
144/135.2

* cited by examiner

*Primary Examiner* — Matthew G Katcoff
(74) *Attorney, Agent, or Firm* — Raymond Y. Chan; David and Raymond Patent Firm

(57) ABSTRACT

A blocking arrangement for preventing the elevating table from moving includes a platform with four threaded stems extending downwardly from the underside of the platform. Each threaded stem has a threaded member and a chain wheel screwed thereon. A chain is trained about the four chain wheels so as to drive the chain wheels and the threaded members to elevate the elevating table. A brake wheel is securely mounted to the chain wheel of one of the threaded stems. The blocking arrangement includes a stop block which is movably connected beneath the elevating table so as to be in contact with the brake wheel to set the predetermined height of the elevating table to prevent any movement due to vibration.

6 Claims, 13 Drawing Sheets

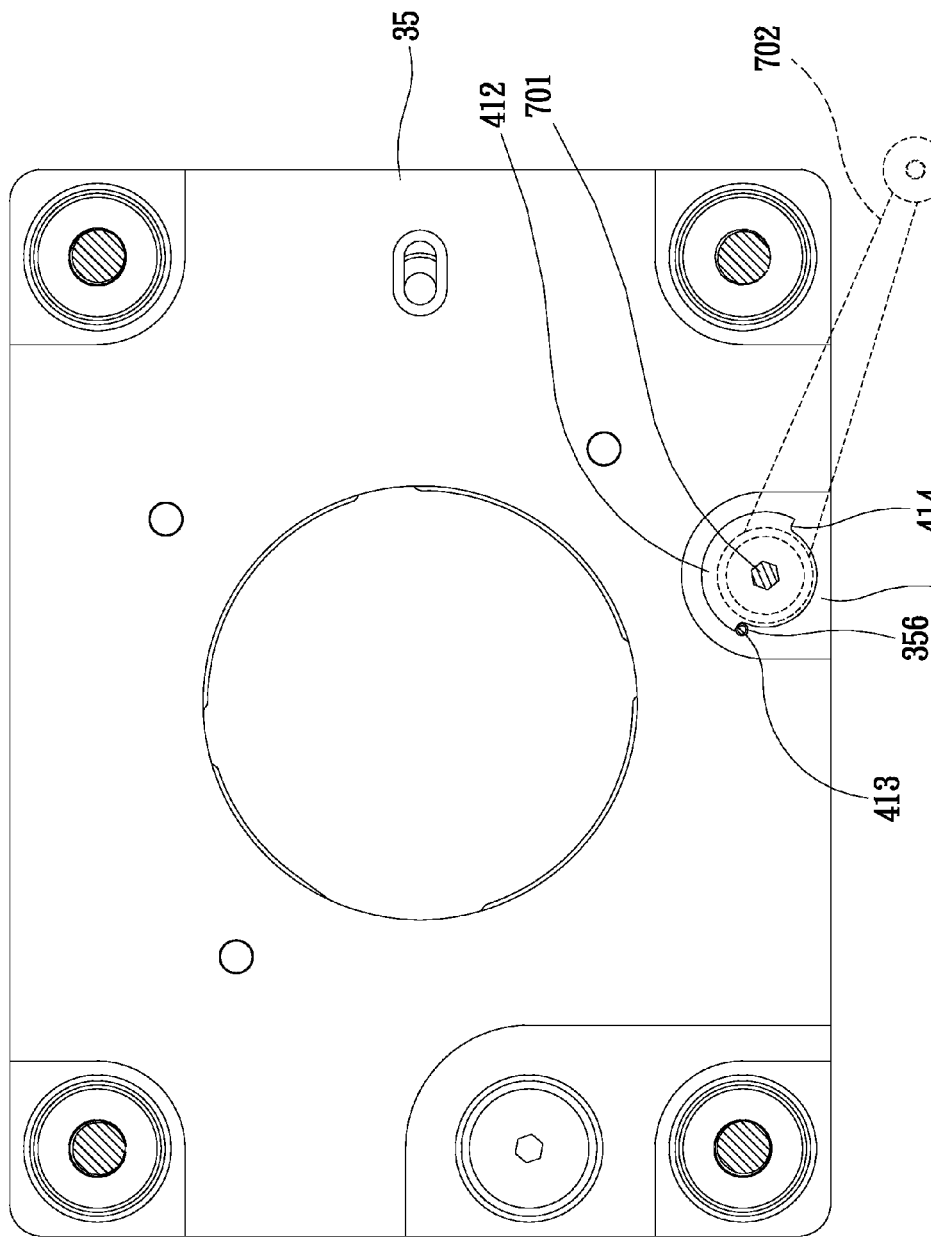

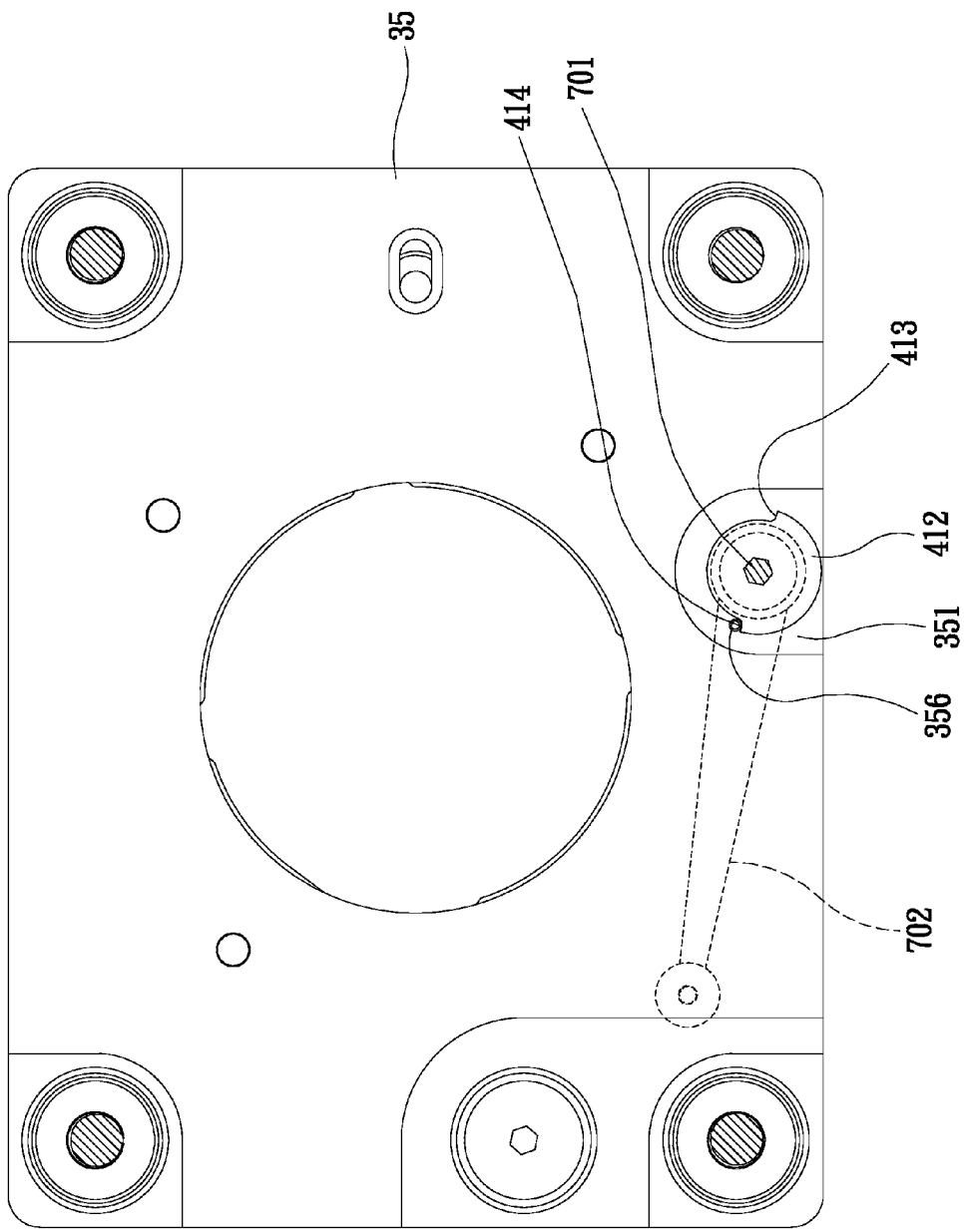

BLOCKING ARRANGEMENT OF ELEVATING DEVICE FOR CARPENTRY WORK

BACKGROUND OF THE PRESENT INVENTION

1. Field of Invention

The present invention relates to an elevating device for adjusting the height of the cutting tool for carpentry work, and more particularly to a blocking arrangement provided for preventing the elevating device from mistakenly moving up or down due to vibration.

2. Description of Related Arts

Please refer to a conventional carpentry elevating device disclosed in a Taiwan Utility Model Application No. 098200328 (hereinafter conventional art), as shown in FIGS. 1 and 2, which is a previous invention of the inventor of this application. The elevating device 10 is installed on a bench 21 of a worktable 20 and comprises a platform 11 and four threaded bolts 12 downwardly extending from the underside of the platform 11. Each threaded bolt 12 has a threaded member 18 screwed thereto and a chain wheel 14 mounted to the respective threaded members 18. The threaded bolts 18 and the chain wheels 14 are positioned at four corners of an elevating board 15 so as to securely clamp the elevating board 15 therebetween. An endless chain 13 is trained around the four chain wheels 14 so that when the chain 13 rotates, the chain wheels 14 are driven to rotate simultaneously so as to drive the corresponding threaded members 18 to move the elevating board 15 up and down through the inner threads (not shown) of the threaded members 18. An electric shaper 17 is installed to the elevating board 15 and a cutting tool 19 extends through a hole 16 of the platform 11 for machining the wooden objects on the platform 11. Therefore, by elevating the elevating platform 15 up and down, a cutting depth of the wooden object can thus be. However, although the conventional art can substantially achieve its objectives, the severe vibration generated by the electric shaper 17 may cause slightly rotation of the threaded members 18 and change the elevation position of the elevating board 15 that will affect the precision of the cutting depth. In order to solve the above problem, the inventor of the present invention makes an improvement therefor.

SUMMARY OF THE PRESENT INVENTION

An objective of the present invention is to provide an elevating device for carpentry work for precisely positioning at the predetermined height being adjusted and preventing the elevating board from any displacement due to the vibration while working on a wooden object.

In order to achieve the above objective, the present invention provides an elevating device which comprises a platform and a plurality of threaded stems downwardly extended from an underside of the platform. Each threaded stem has a threaded member screwed thereto and a chain wheel mounted to the respective threaded member. The threaded members and the chain wheels are positioned at four corners of an elevating table so as to rigidly clamp the elevating table therebetween. A chain is trained about the four chain wheels in such a manner that when the chain rotates, the chain wheels are driven to rotate simultaneously so as to drive the threaded members to rotate at the same time and thus the elevating table is elevated up and down through the inner threads of the threaded members. A brake wheel is provided below one of the chain wheels on one of the threaded stems to rotate with the respective chain wheel simultaneously. A stop block is provided beneath the elevating table in a reciprocally manner with respect to the brake wheel. The stop block has an end connected with a longitudinal eccentric axle which has a top portion rotatably connected to the elevating table and an eccentric portion formed at a lower end of the eccentric axle. The stop block also has an oval hole provided for a bolt pivotally passing therethrough while an end portion of the bolt is held by the stop block to prevent dropping down. A top end of the bolt is supported and positioned to the elevating table, so that when the eccentric axle rotates an angle in one direction, the stop block is driven to contact against the brake wheel so as to prevent the chain wheel and threaded member of the same threaded stem from being rotated, and thus to prevent the other chain wheels and threaded members of the other threaded stems from any rotation to precisely position the elevating table at its predetermined height being adjusted. When the eccentric axle rotates an angle in another direction, the stop block is driven back to its original position, wherein a top end of the eccentric axle has a first stop portion and a second stop portion and the eccentric axle is to rotatable between the first and second stop portions reciprocally. A torsion spring is mounted on the eccentric axle and has two legs having an angle therebetween. The two legs are respectively hooked to two stop pins, wherein one of the stop pins is connected to the stop block and the other one of the stop pin is affixed to the underside of the elevating table, so that the stop block is biased by the resilient pushing force of the torsion spring to keep the bolt contacting with the inner wall of the oval hole of the stop block in order to prevent the stop block from being loosened.

BRIEF DESCRIPTION OF THE DRAWINGS

FIGS. 7A, 7B are plan views illustrating that the wrench is rotated to adjust the blocking arrangement of the present invention.

DETAILED DESCRIPTION OF THE PREFERRED EMBODIMENT

Figure 1:
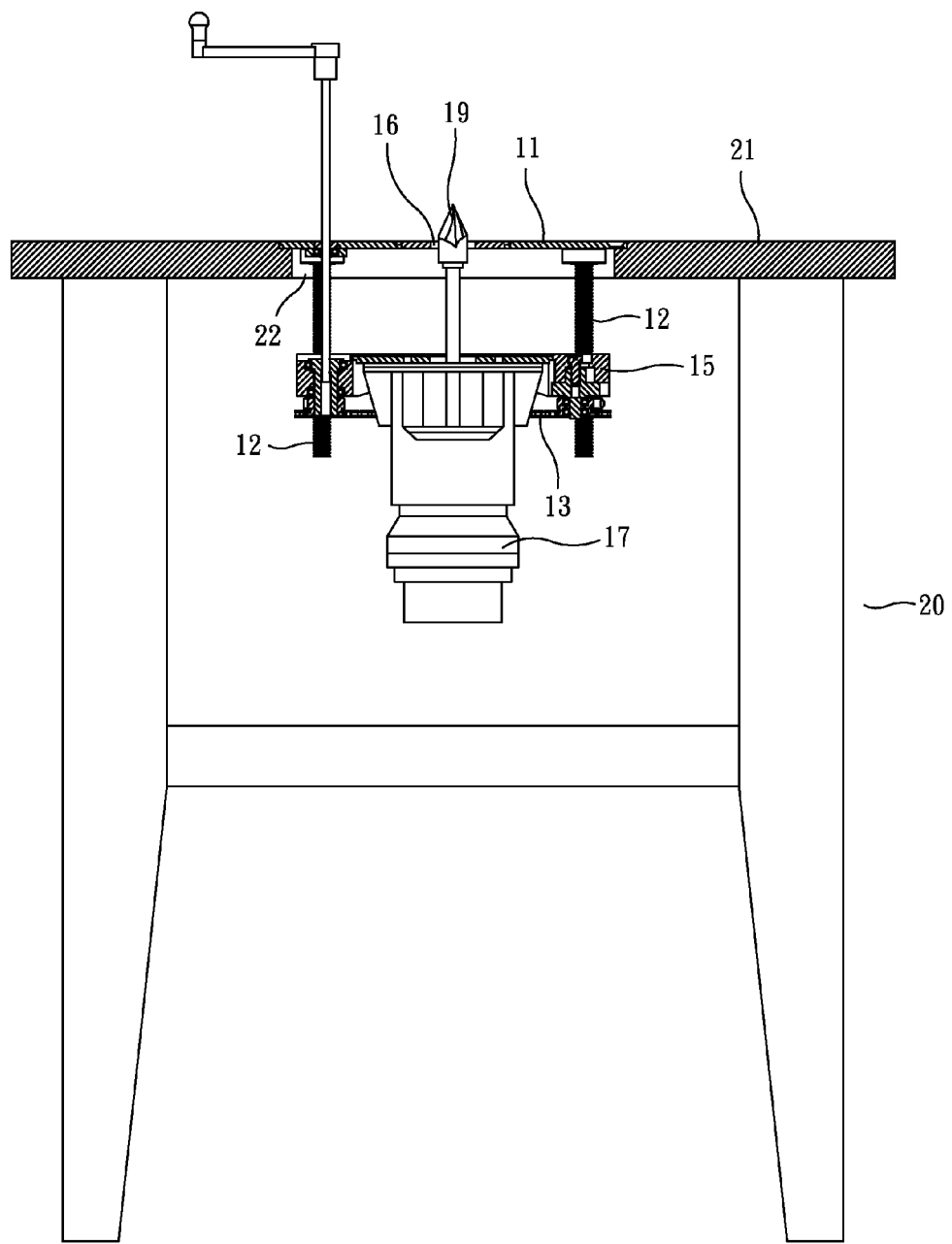
FIG. 1 illustrates the conventional elevating device installed to a work table.
Figure 2:
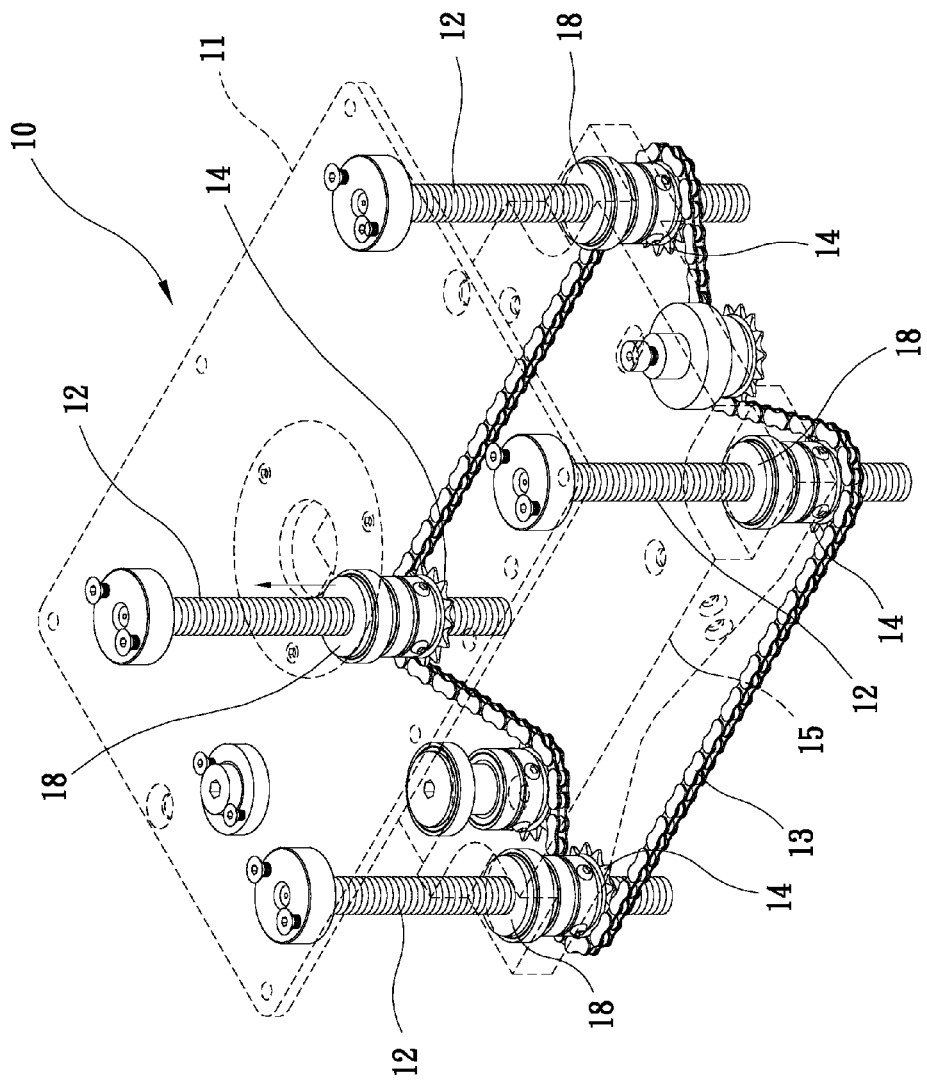
FIG. 2 illustrates the conventional elevating device.
Figure 3:
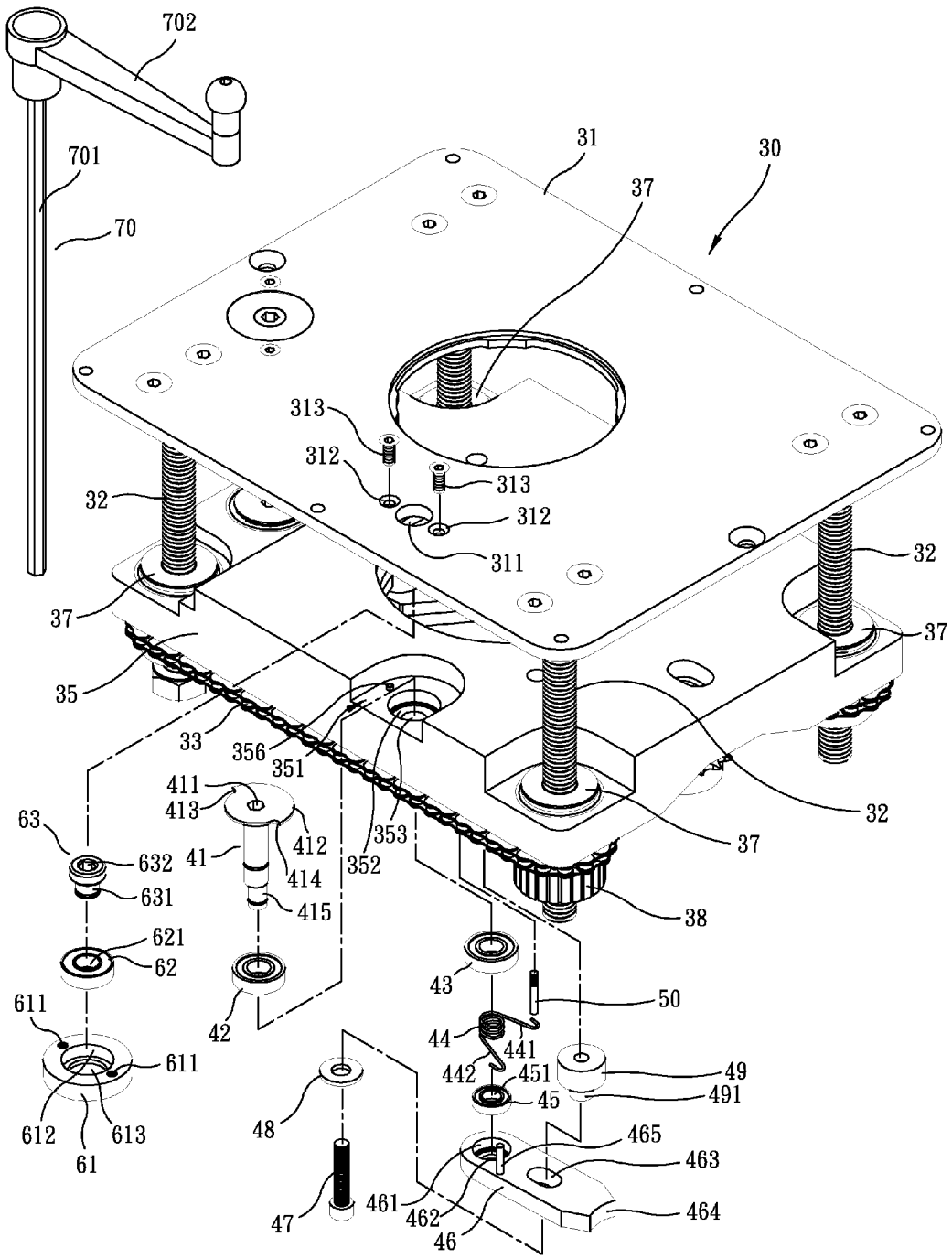
FIG. 3 is an exploded view illustrating the elevating device and the stop device of the present invention.
Figure 4:
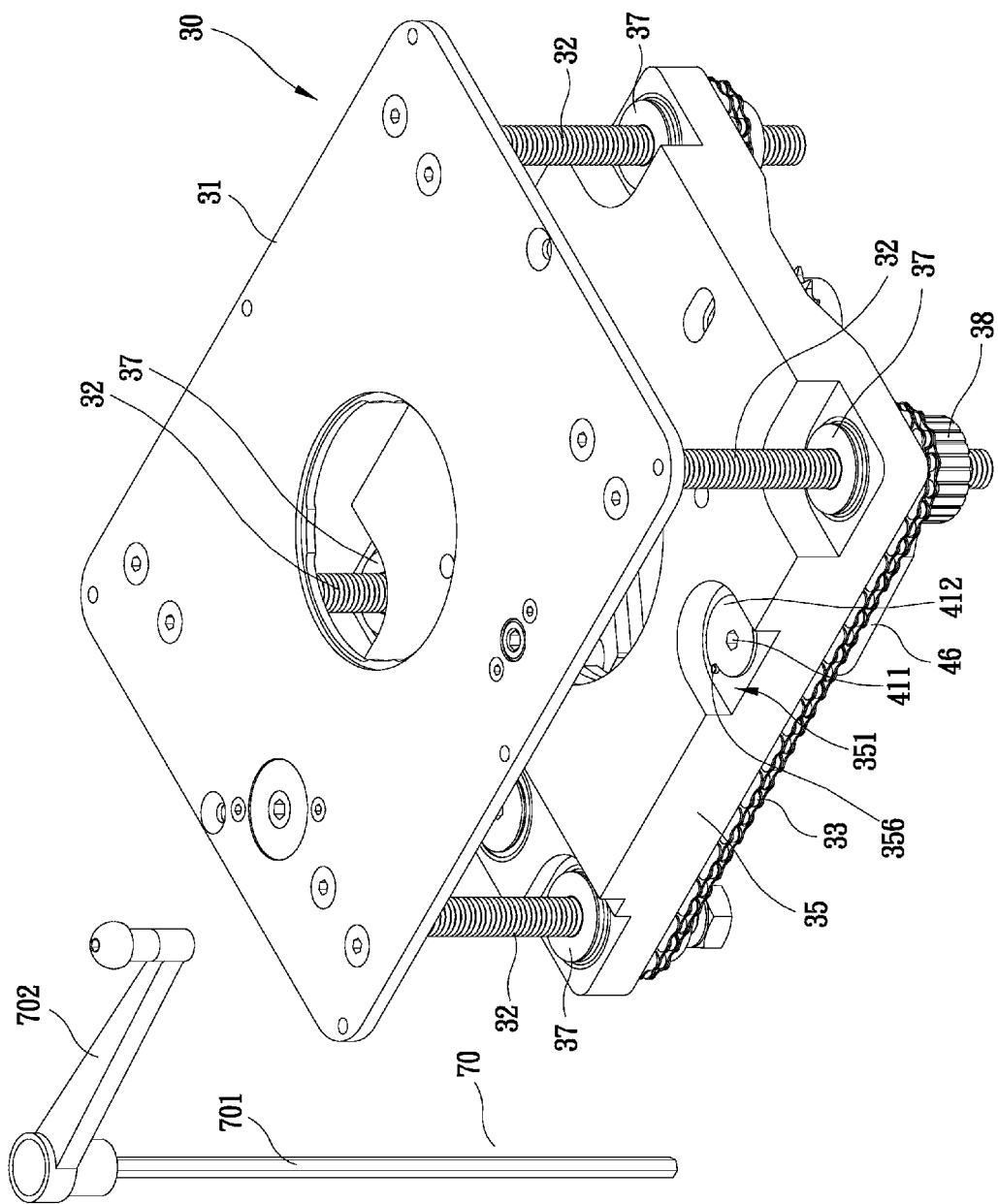
FIG. 4 is a perspective view to show the elevating device and the blocking arrangement of the present invention.
Figure 5:
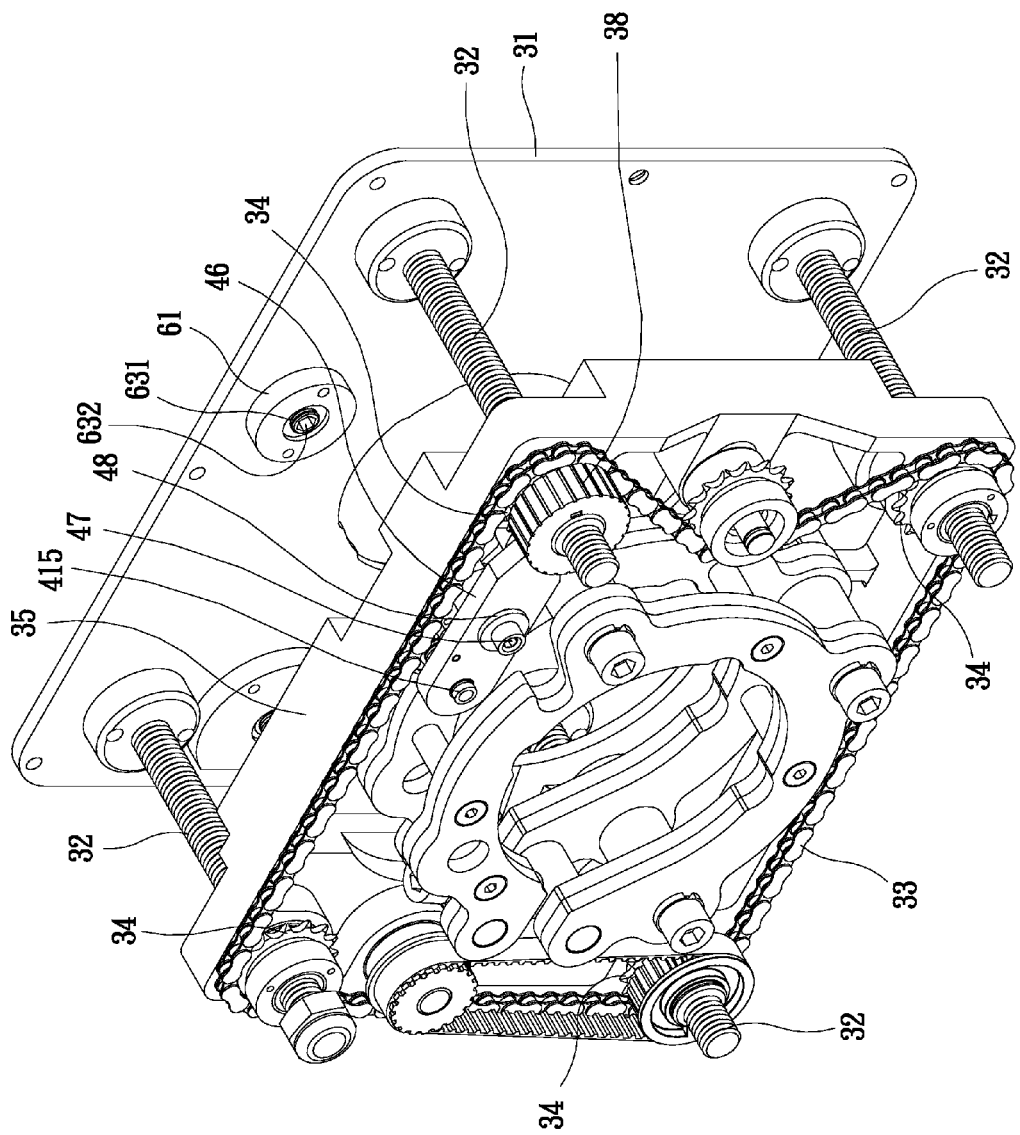
FIG. 5 is another perspective view illustrating the elevating device and the blocking arrangement of the present invention.
Figure 6:
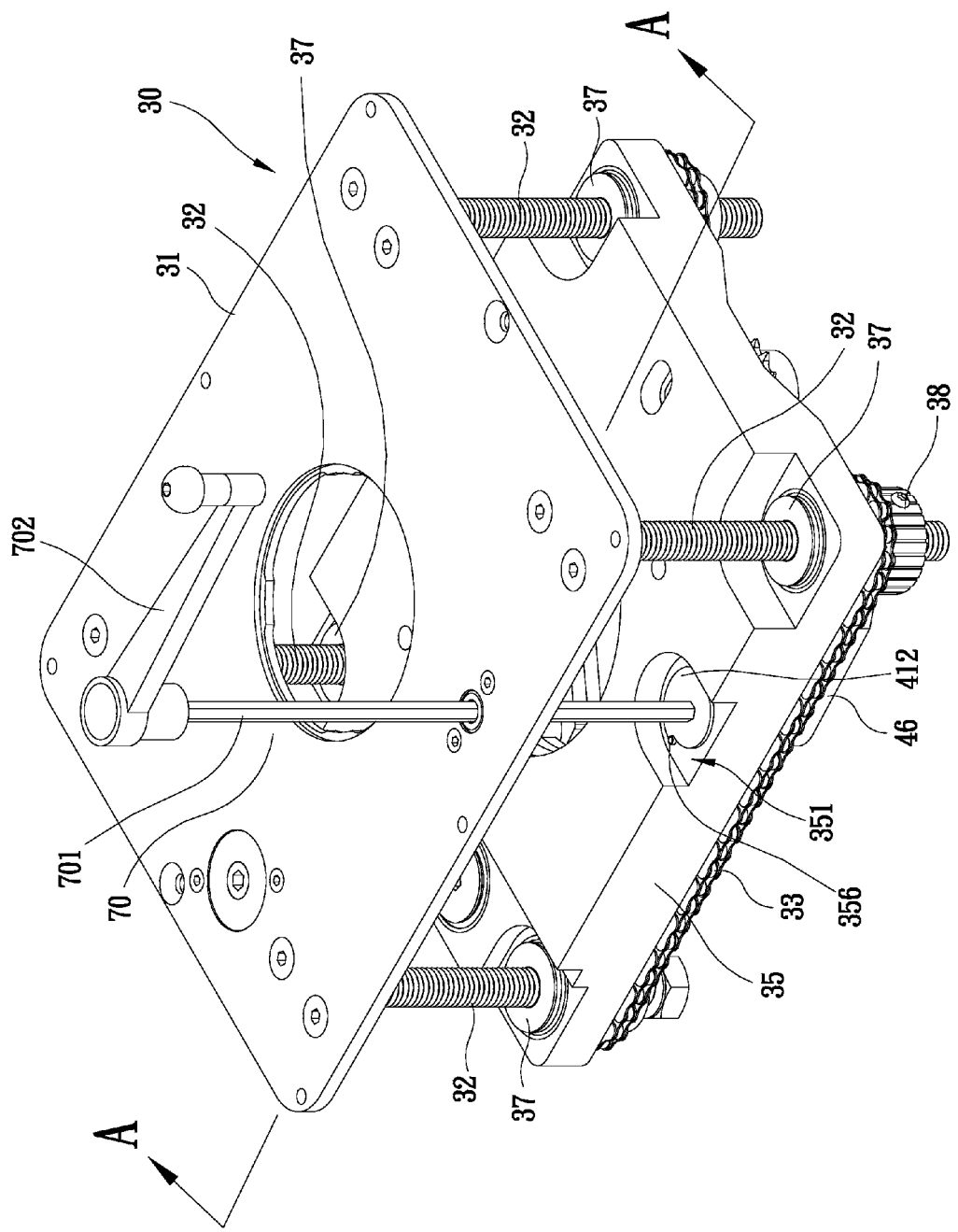
FIG. 6 is a perspective view illustrating the elevating device and the blocking arrangement of the present invention, wherein the wrench is inserted into the eccentric axle of blocking arrangement of the present invention.

The following description is disclosed to enable any person skilled in the art to make and use the present invention. Preferable embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 3 to 7A and 7B, the elevating device 30 of the present invention comprises a platform 31 and four threaded stems 32 downwardly extended from the underside of the platform 31. Each threaded stem 32 has a threaded member 37 screwed thereto and each threaded member 37 has a chain wheel 34 mounted thereto adapted for driving the threaded member 37 to rotate simultaneously. The threaded members 37 and the chain wheels 34 are positioned at four corners of an elevating table 35 so as to rigidly clamp the elevating table 35 therebetween. A chain 33 is trained about the four chain wheels 34, so that when the chain 33 rotates, the chain wheels 34 is driven to rotate simultaneously as well as the threaded members 37 at the same time, so as to drive the elevating table 35 to move up and down by means of the inner threads 371 of the threaded members 37.

The blocking arrangement is provided at an underside of the elevating table 35 and adjacent to one of the threaded stems 32. A brake wheel 38 is provided at a lower portion of the chain wheel 34 on one of the threaded stems 32 in such a manner that the brake wheel 38 is able to be rotated with the chain wheels 34 simultaneously. The blocking arrangement comprises at least an eccentric axle 41 and a stop block 46, wherein the eccentric axle 41 is longitudinally provided on the elevating table 35 and has a top end thereof forms an enlarged top end member 412. A portion of the top end member 412 of the eccentric axle 41 is removed to form a first stop portion 413 and a second stop portion 414. A center position of the top end member 412 forms a hexagonal indenting hole 411 while a bottom end of the eccentric axle 41 forms an eccentric portion 415 biasing to one side thereof. The elevating table 35 has a recess 351 formed in the top side thereof with respect to the eccentric axle 41, wherein a through hole 353 is formed in the recess 351 extending through the elevating table 35. Two enlarged reception recesses 353, 354 are formed at two ends of the through hole 353 respectively, wherein two bearings 42, 43 are respectively accommodated in the two reception recesses 353, 354 so that the eccentric axle 41 can be free to rotate by means of the two bearings 42, 43. A protrusion 356 is protruded in the recess 351 to block with the first and second stops 413, 414 respectively so as to restrict the eccentric axle 41 to be rotated between the first and second stops 413, 424 only.

The stop block 46 has a through hole 462 formed at one end thereof and a reception recess 461 formed in the top side of the stop block 46 to communicate with the through hole 462. A bearing 45 is fittingly inserted in the reception recess 461 and has a central passage hole 451, wherein the eccentric portion 415 formed at the bottom end of the eccentric axle 41 is fittingly inserted in the passage hole 451 so as to define a linking connection between the eccentric axle 41 and the stop block 46. The other end of the stop block 46 forms a curved end portion functioning as a stop portion 464. The stop block 46 has an oval hole 463 formed in a middle portion thereof, wherein a bolt 47 is extended through a washer 48, the oval hole 463, and a positioning member 49, and then is fixed to an indented threaded hole 355 provided in the underside of the elevating table 35, so that the stop block 46 is blocked by the bolt 47 and the washer 48 to prevent dropping down. A bottom end of the positioning member 49 forms a narrowed neck 491 which is inserted into the oval hole 463, so that the stop block 46 is capable of moving back and forth within the oval hole 463.

In order to prevent any impact between the stop block 46 and the positioning member 49 that may cause noise generated and assist the return of the stop block 46 to its original position, a torsion spring 44 is mounted to an outer circumferential surface of the eccentric axle 41. The torsion spring 44 has two legs 441, 442 which are respectively hooked to two stop pins 50, 465, wherein the first leg 441 is hooked with the first stop pin 50 and the second leg 442 is hooked with the second stop pin 465. The stop pin 50 is affixed to the underside of the elevating table 35 to prevent the stop block 46 from any displacement, wherein the stop block 46 is biased towards one side by means of the extending spring effect of the torsion spring 44 applied thereto and the outside of the neck 491 of the positioning member 49 is remained in tight contact with the inner wall of the oval hole 463 of the stop block 46 so as to prevent the stop block 46 from generating noise and being in loosen condition.

In order to rotate the eccentric axle 41 at the top of the platform 31 directly by a wrench 70, the platform 31 has a through hole 311 and two small holes 312 provided therein. Two screws 313 are extending through the two small holes 312 respectively and screwed to two threaded holes 611 of a collar 61 respectively, so that the collar 611 is mounted to the underside of the platform 31. The collar 61 has a passage hole 613 and a receiving recess 612 formed at a top portion of the passage hole 613. A bearing 62 is received in the receiving recess 612. The bearing 62 has a passage hole 621 for a narrowed neck portion 631 of a rotatable member 63 to be securely inserted therein. The rotatable member 63 has a hexagonal through hole 632 extending therethrough while the rotatable member 63 is positioned in the through hole 311 so that a hexagonal element 701 of the wrench 70 can be extended through the hexagonal through hole 632 of the rotatable member 63 and downwardly inserted in the indenting hole 411 of the eccentric axle 41. When a handle 702 of the wrench 70 is rotated clockwise or counter-clockwise, the eccentric axle 41 is rotated simultaneously and correspondingly.

Figure 8A:
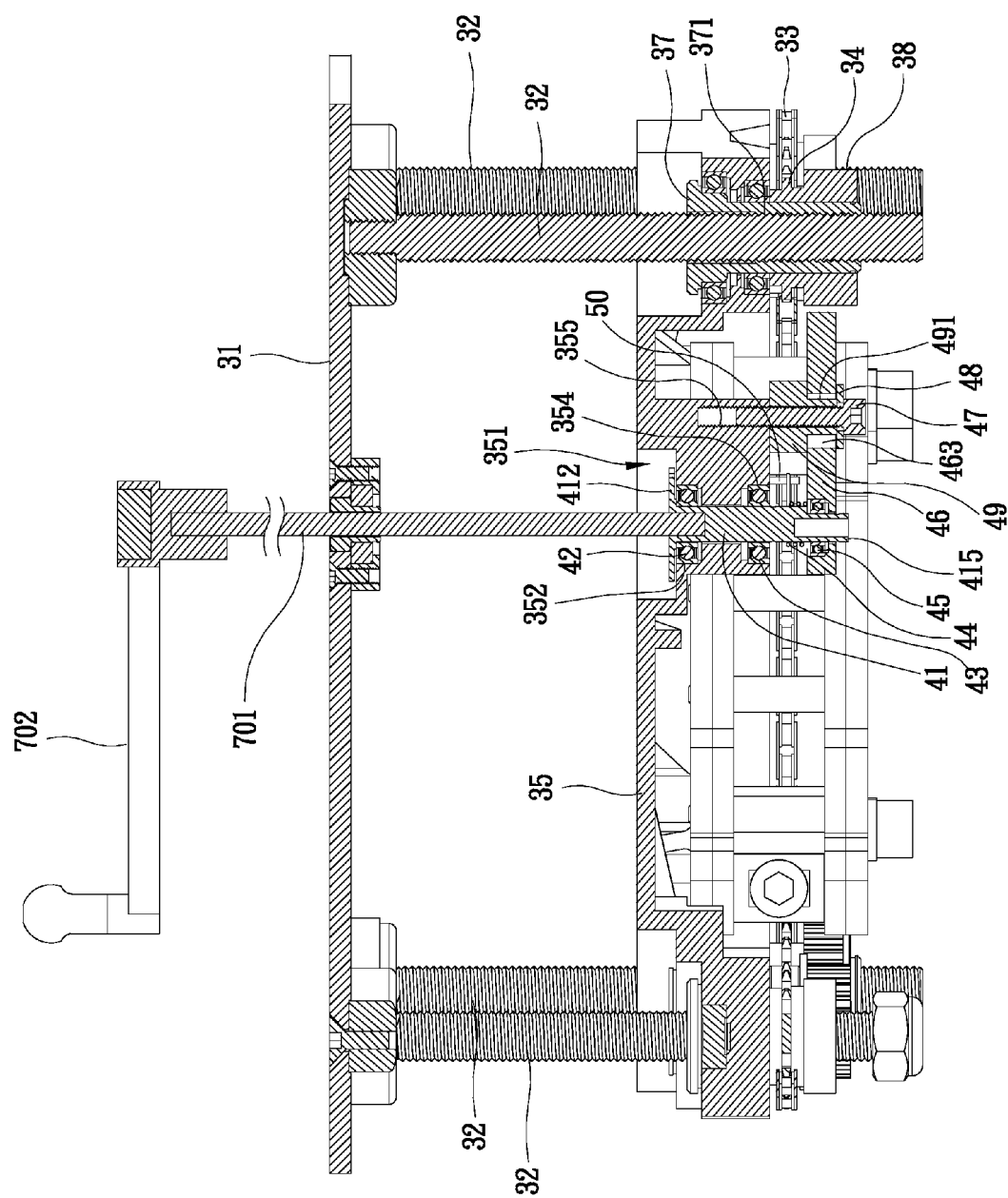
FIGS. 8A, 8B are cross sectional views, taken along line A-A in FIG. 6.
Figure 8B:
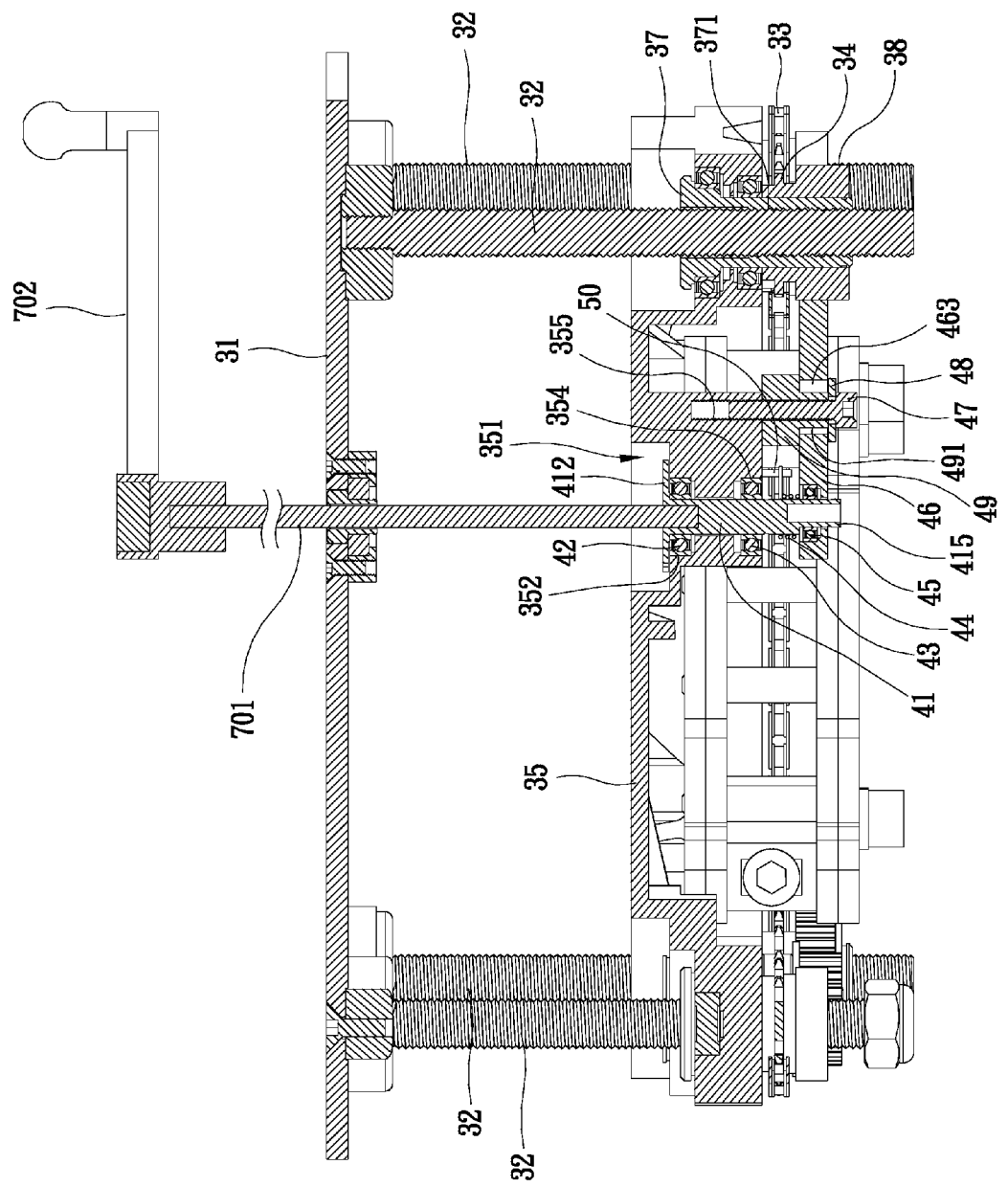
Figure 9A:
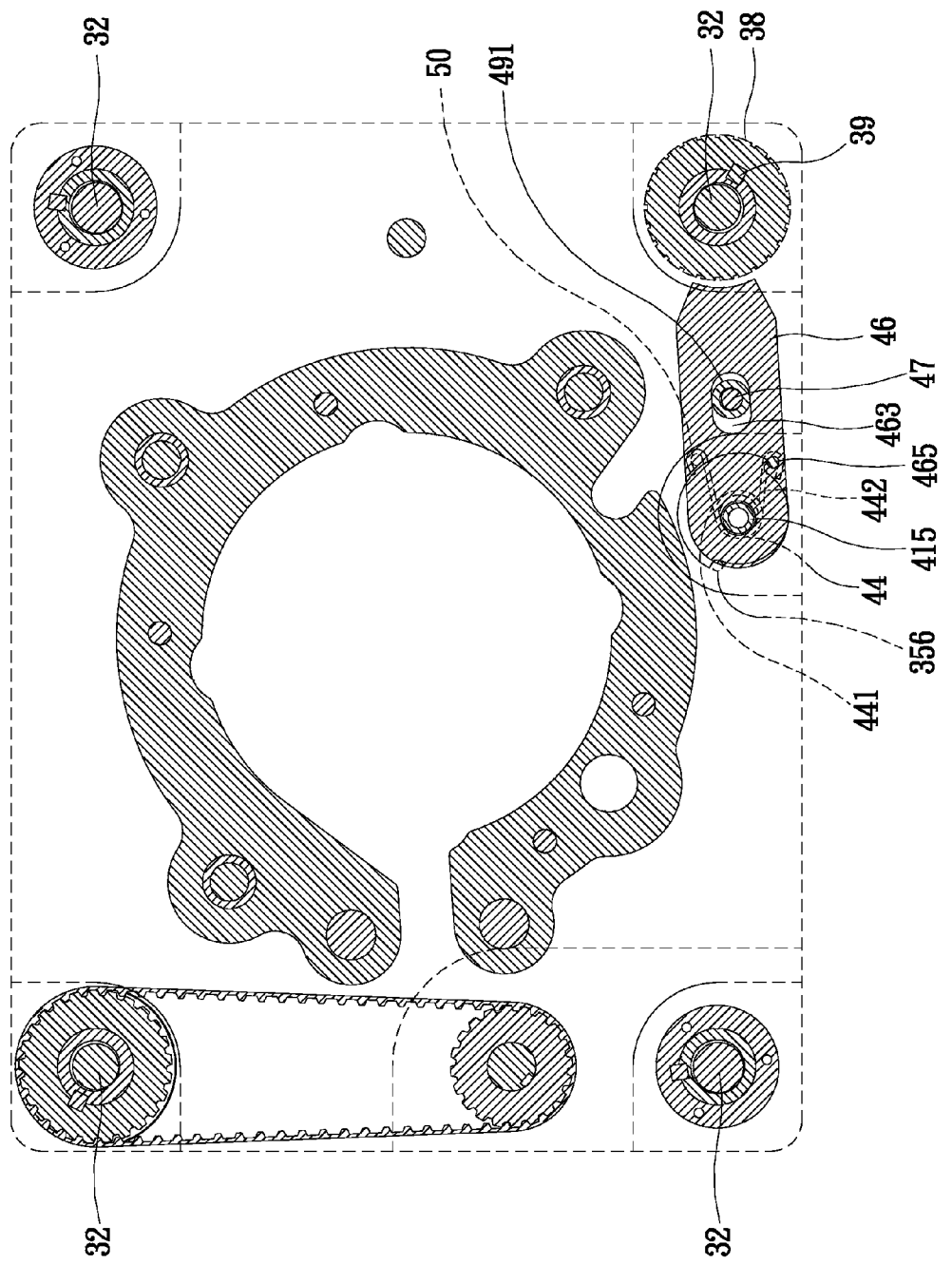
FIGS. 9A, 9B are sectional views illustrating that the stop block is operated to block the brake wheel of the blocking arrangement of the present invention.
Figure 9B:
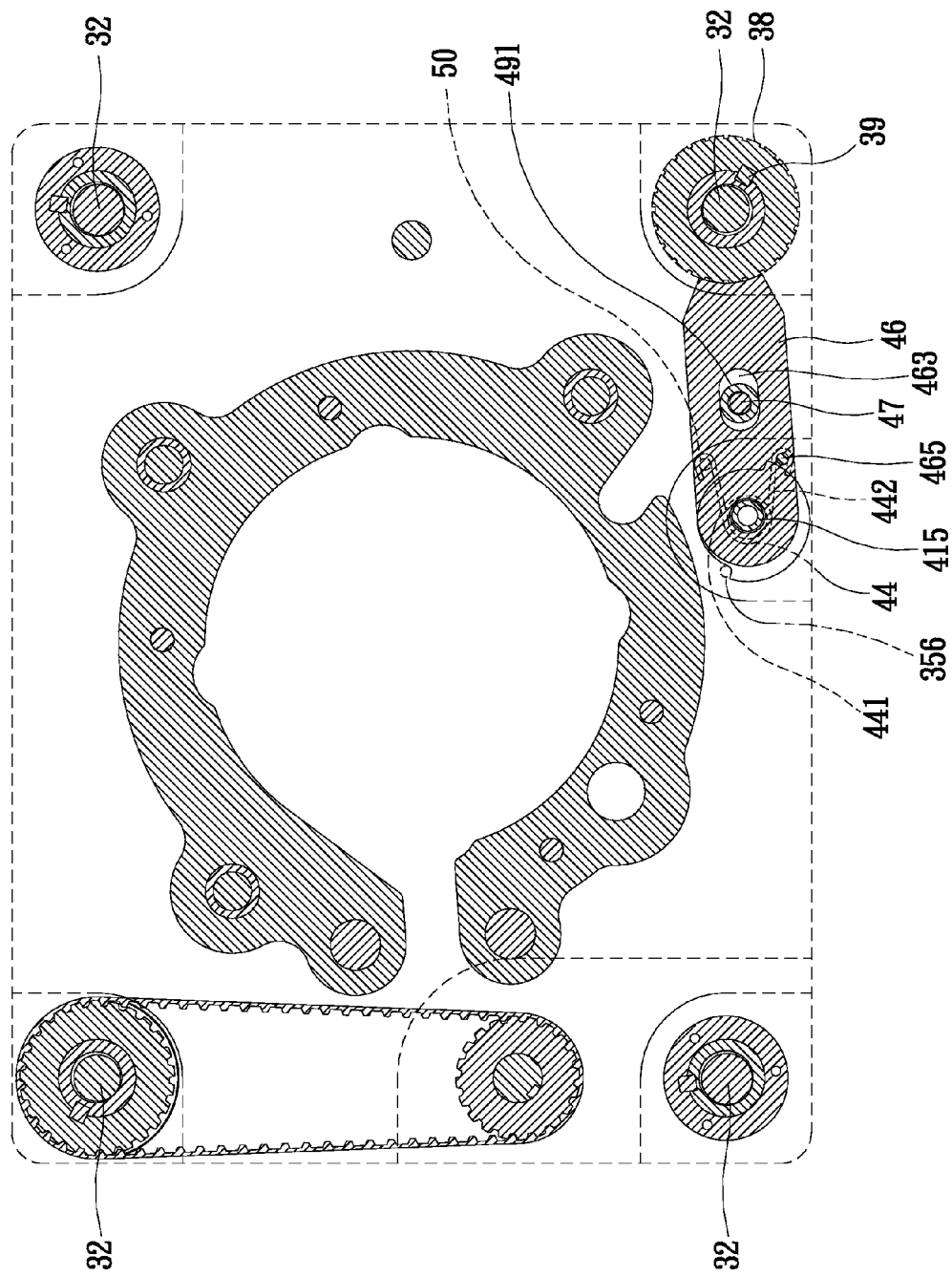
Figure 10:
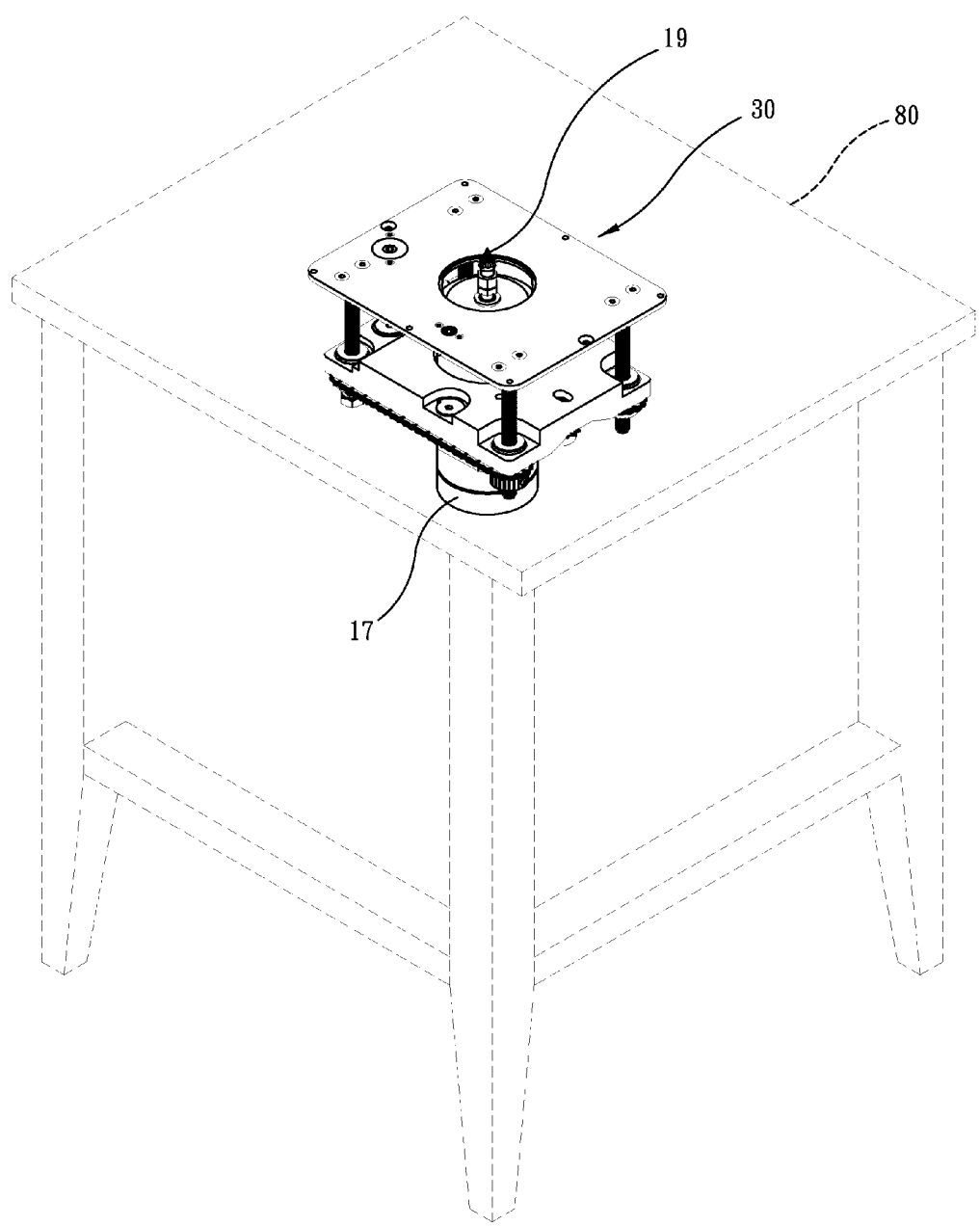
FIG. 10 is a perspective view illustrating that the elevating device and the blocking arrangement of the present invention are installed to a work table.

Referring to FIGS. 7A, 7B to 9A, 9B, when the stop block 46 and the brake wheel 38 are not being held against with each, the handle 702 of the wrench 70 is positioned at the right side (as shown in FIG. 7A). The first stop 413 is blocked with the protrusion 356 and the eccentric portion 415 of the eccentric axle 41 is located at a distal position away from the brake wheel 38 (as shown in FIG. 8A). An angle between the first and second legs 441, 442 of the torsion spring 44 is slightly larger to store a resilient reaction force in the torsion spring 44. When the handle 702 is rotated clockwise, the eccentric axle 41 as well as its eccentric portion 415 provided at its bottom end is rotated clockwise at the same time, so as to drive the stop block 46 to rotate in a deviation manner. The movement trajectory of the stop block 46 is to move inwardly and then towards a right side and the second stop pin 465 of the stop block 46 is slightly moved toward the first stop pin 50 to narrow the angle between the first and second legs 441, 442 of the torsion spring 44 and to store a resilient reaction force. When the eccentric portion 415 is rotated to its maximum displacement, the stop portion 464 of the stop block 46 is blocked against the brake wheel 38. When the handle 702 is continuously rotated until the second stop 414 is blocked against the protrusion 356, the eccentric portion 415 moves beyond a central axis of the stop block 46 and the stop portion 464 of the stop block 46 is tightly blocked against the brake wheel 38. If the handle 702 is not rotated in the opposite direction, the resilient reaction force stored in the torsion spring 44 cannot return the stop block 46 to its original position, so that the brake wheel 38 is tightly blocked by the stop block 46 and thus the chain wheels 34 and the threaded members 37 are unable to be rotated correspondingly. In other words, the chain 33 will not drive the other threaded stems 32 and the chain wheels 34 and threaded members 37 thereon to move either. Accordingly, when the electric shaper 17 is in operation, the elevating table 35 is firmly positioned and will not erroneously elevate up or down due to vibration so as to ensure the wooden workpiece being cut to its predetermined depth. In the contrary, when the handle 702 is rotated counter-clockwise, the eccentric axle 41 as well as its eccentric portion 415 is rotated counter-clockwise at the same time. When the eccentric portion 415 moves beyond a central axis of the stop block 46, the resilient reaction force stored by means of the first and second legs 441,442 of the torsion spring 44 is released to drive the stop block 46, the eccentric portion 415 and the handle 702 to return back to their original positions and the stop block 46 is moved to unblock with the brake wheel 38 and the first stop 413 of the eccentric axle 41 is blocked against the protrusion 356 again. Therefore, the elevating table 35 is ready for another adjustment to set the height of cutting tool 19 of the electric shaper 17.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A blocking arrangement of an elevating device for carpentry work, wherein the elevating device comprising a platform and four threaded stems extending downwardly from an underside of the platform, each of the threaded stems having a threaded member a chain wheel screwed thereon, the threaded members and the chain wheels being positioned at four corners of a elevating table so as to rigidly clamp the elevating table therebetween, a chain being trained about the four chain wheels, wherein when the chain rotates, the chain wheels are driven to rotate simultaneously so as to drive the respective the threaded members to rotate by means of the inner threads thereof in order to elevate the elevating table up and down, wherein a brake wheel is provided below the chain wheel of one of the threaded stems in such a manner that the brake wheel and the respective threaded stem are able to be rotate simultaneously, wherein a stop block is provided beneath the elevating table and positioned with respect to the brake wheel, the stop block having an end connected with a longitudinal eccentric axle which has a top end rotatably pivoted to the elevating table, an eccentric portion being formed at a bottom end of the eccentric axle, the stop block having an oval hole and a bolt being extended through the oval hole, wherein an end of the bolt is blocked against the stop block to prevent dropping down while a top end of the bolt is affixed to the elevating table, wherein when the eccentric axle rotates an angle clockwise or counter-clockwise, the stop block is able to be moved to block against or away from the brake wheel, so as to render the threaded member and the chain wheel on the respective threaded stem being blocked from any movement, in order to prevent the threaded members and the chain wheels of the threaded stems from rotation to ensure elevating table to be positioned at a predetermined height being adjusted.

2. The blocking arrangement as claimed in claim 1, wherein the top end of the eccentric axle has a first stop and a second stop, wherein the first and second stops render the eccentric axle rotatable within an angle between the first and second stops only.

3. The blocking arrangement as claimed in claim 1, wherein a torsion spring is mounted to the eccentric axle and has two legs which are respectively hooked to two stop pins, wherein one of the stop pins is provided at the stop block and the other stop pin is provided at an underside of the elevating table, wherein the stop block is biased towards one side by means of the pushing force of the legs of the torsion spring to keep the bolt contacting with an inner wall of the oval hole of the stop block in order to prevent the stop block from being loosened.

4. The blocking arrangement as claimed in claim 1, wherein the elevating table has a recess formed in a top side thereof with respect to the eccentric axle, wherein a through hole is formed in the recess extending through the elevating table, wherein two enlarged reception recesses are formed at two ends of the through hole respectively, wherein two bearings are respectively accommodated in the two reception recesses so that the eccentric axle is able to freely rotate by means of the two bearings.

5. The blocking arrangement as claimed in claim 1, wherein the eccentric axle has a hexagonal indenting hole formed in a top end member thereof, the platform providing a rotatable member which has a hexagonal through hole therethrough, wherein the hexagonal through hole and the hexagonal indenting hole of the eccentric axle are aligned correspondingly, so that a hexagonal element of a wrench is able to extend through the hexagonal through hole and then insert in the hexagonal indenting hole of the eccentric axle, therefore when a handle of the wrench is rotated clockwise or counter-clockwise, the eccentric axle is rotated simultaneously.

6. The blocking arrangement as claimed in claim 2, wherein the elevating table has a recess formed in a to side thereof with respect to the eccentric axle and a protrusion is protruded from the recess of the elevating table to block with the first and second stops respectively so as to restrict the eccentric axle to be rotated between the first and the second stops only.

* * * * *